United States Patent
Jackson, Sr. et al.

(10) Patent No.: US 7,004,457 B2
(45) Date of Patent: Feb. 28, 2006

(54) PNEUMATIC VEHICLE JACKING SYSTEM

(76) Inventors: Clinton Jackson, Sr., 2827 Magnolia, St. Louis, MO (US) 63118; Howard E. Robinson, Jr., 3390 Greenway Chase Dr., Florissant, MO (US) 63031

( * ) Notice: Subject to any disclaimer, the term of this patent is extended or adjusted under 35 U.S.C. 154(b) by 0 days.

(21) Appl. No.: 10/735,780

(22) Filed: Dec. 16, 2003

(65) Prior Publication Data

US 2005/0127343 A1    Jun. 16, 2005

(51) Int. Cl.
*B60S 9/02*    (2006.01)
(52) U.S. Cl. ................. 254/423; 254/93 H; 280/763.1; 280/766.1
(58) Field of Classification Search ................. 254/423, 254/418–427, 93 H, 89 H; 280/766.1, 763.1
See application file for complete search history.

(56) References Cited

U.S. PATENT DOCUMENTS

| | | | | |
|---|---|---|---|---|
| 5,143,386 A | * | 9/1992 | Uriarte | 254/418 |
| 5,176,391 A | * | 1/1993 | Schneider et al. | 280/6.153 |
| 5,722,641 A | * | 3/1998 | Martin et al. | 254/423 |
| 5,931,500 A | * | 8/1999 | Dagnese | 280/766.1 |
| 6,079,742 A | * | 6/2000 | Spence | 280/766.1 |
| 6,404,073 B1 | * | 6/2002 | Chiang | 307/10.1 |

* cited by examiner

*Primary Examiner*—Lee D. Wilson
(74) *Attorney, Agent, or Firm*—Henry W. Cummings

(57) ABSTRACT

An automobile pneumatic jack assembly includes at least one pneumatic cylinder assembly capable of lifting a vehicle to a suitable height to allow repairs to tires and other vehicle parts; at least one compressor, at least one distribution manifold assembly, and electrical controls for controlling the operation of the pneumatic jack assembly. The automobile pneumatic jack assembly may include up to four pneumatic cylinders mounted at various locations on an automobile chassis having a frame. The pneumatic cylinder assemblies are preferably mounted to the automobile chassis through the frame by welding, mechanical fasteners, or any other suitable mechanisms.

17 Claims, 5 Drawing Sheets

PNEUMATIC VEHICLE JACKING SYSTEM

I FIELD OF THE INVENTION

The present invention relates to prior art of pneumatic lift systems and more specifically to an automobile pneumatic jack assembly that lifts a vehicle and conveniently suspends a tire off the ground for changing and/or repairing.

II BACKGROUND OF THE INVENTION

There are available various conventional automobile tire suspending lift mechanisms that do not provide the safe, simple, and cost effective method of the present invention. Known prior art pneumatic vehicle jack systems include U.S. Pat. No. 4,174,094, U.S. Pat. No. 4,706,937, U.S. Pat. No. 4,993,688, and U.S. Pat. No. 5,232,206.

Prior art contains similar characteristics but the present invention offers unique safety features not provided in the prior art.

III SUMMARY OF THE INVENTION

A. Objects of the Invention

One objective of the present invention is to provide a novel pneumatic jack system that utilizes the four quadrants of an automobile.

Another objective of the present invention is to provide a novel pneumatic jack system that provides a clear process of communication by use of indicators.

Another objective of the present invention is to provide a pneumatic jacking system for an automobile that will safely and conveniently lift a tire off of the ground to repair or change said tire.

Another objective of the present invention is to avoid a hydraulic system that is heavy and includes hydraulic fluid is non-biodegradeable, making it environmentally unfriendly.

Another objective of the present invention is to provide a pneumatic jacking system for an automobile that will safely and conveniently suspend a tire of an automobile off of the ground for changing and/or repairing said tire and to give a clear communication of the process by use of indicators, accomplishing this task in an environmentally friendly way.

B. Summary

An automobile pneumatic jack assembly includes at least one pneumatic cylinder assembly capable of lifting a vehicle to a suitable height to allow repairs to tires and other vehicle parts; at least one compressor, at least one distribution manifold assembly, and electrical controls for controlling the operation of said pneumatic jack assembly.

The automobile pneumatic jack assembly may include up to four pneumatic cylinders mounted at various locations on an automobile chassis having a frame. The said pneumatic cylinder assemblies are preferably mounted to said automobile chassis through said frame by welding, mechanical fasteners, or any other suitable means.

The air compressor uses vehicle electrical power and is capable of providing adequate air pressure to lift a vehicle to a suitable height to allow repairs to tires and other automobile parts. The air compressor is mounted in a location within the vehicle permitting efficient routing of pneumatic and electrical supplies. The distribution manifold assembly accepts air pressure from said air compressor and delivers it to said pneumatic cylinders via pneumatic solenoids. The distribution manifold assembly contains a plurality of said pneumatic solenoids, one for each of the said pneumatic cylinders.

IV. THE DRAWINGS

V. DESCRIPTION OF PREFERRED EMBODIMENTS

Figure 1:
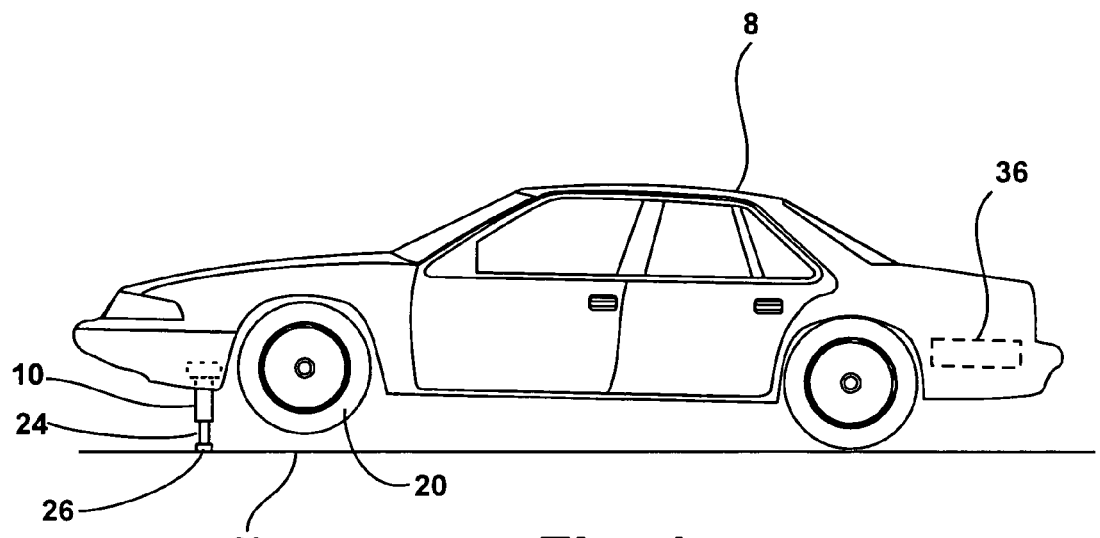
FIG. 1 is a side view of a pneumatic automobile jack system that encompasses all the dynamics of the present invention.

FIG. 1 illustrates a typical vehicle 8 with one tire 20 off of the ground 80. The lifting apparatus comprises cylinder 10 and piston rod 24. Footplate 26 contacts the ground 80 to provide a broad base and reduce the possibility of the lifting apparatus sinking into the ground 80.

Figure 2:
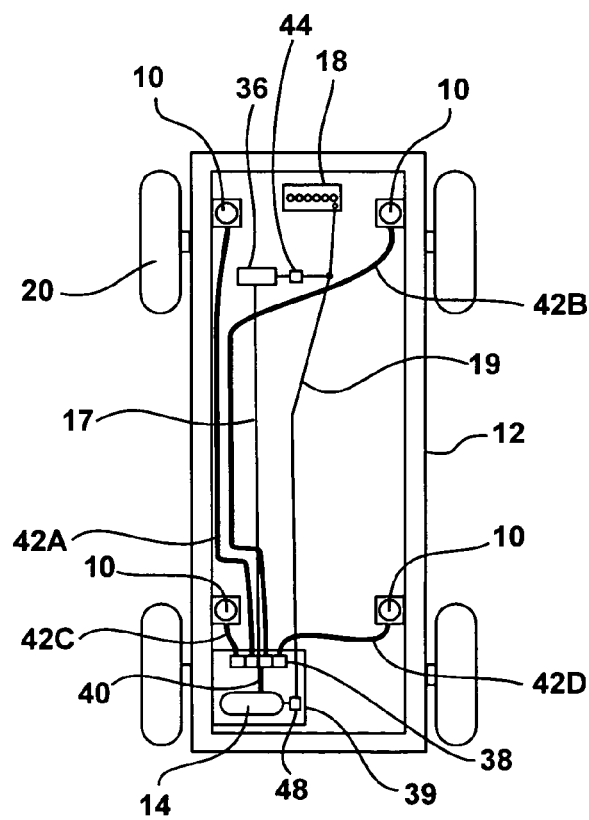
FIG. 2 is a top view of an automotive frame showing all components of the present invention as installed.

FIG. 2 illustrates a motor vehicles frame 12 showing all major components of the present invention. Enclosure 39 is typically mounted at the rear of the vehicle, and contains compressor 14, relay 48, and 4-way distribution manifold 38. Cylinders 10 may be mounted to the inside of frame 12 by means of welding or mechanical fasteners. Air lines 42A, 42B, 42C, and 42D connects each cylinder 10 to solenoids 16A, 16B, 16C, and 16D (FIG. 4A), which are contained within 4-way distribution manifold 38.

Battery 18 (FIG. 2) provides electrical power via supply wiring 19 to control box 36 and relay 48. Relay 48 provides power to compressor 14 when commanded by control box 36 and control wiring 17, as detailed later in this description.

Figure 3:
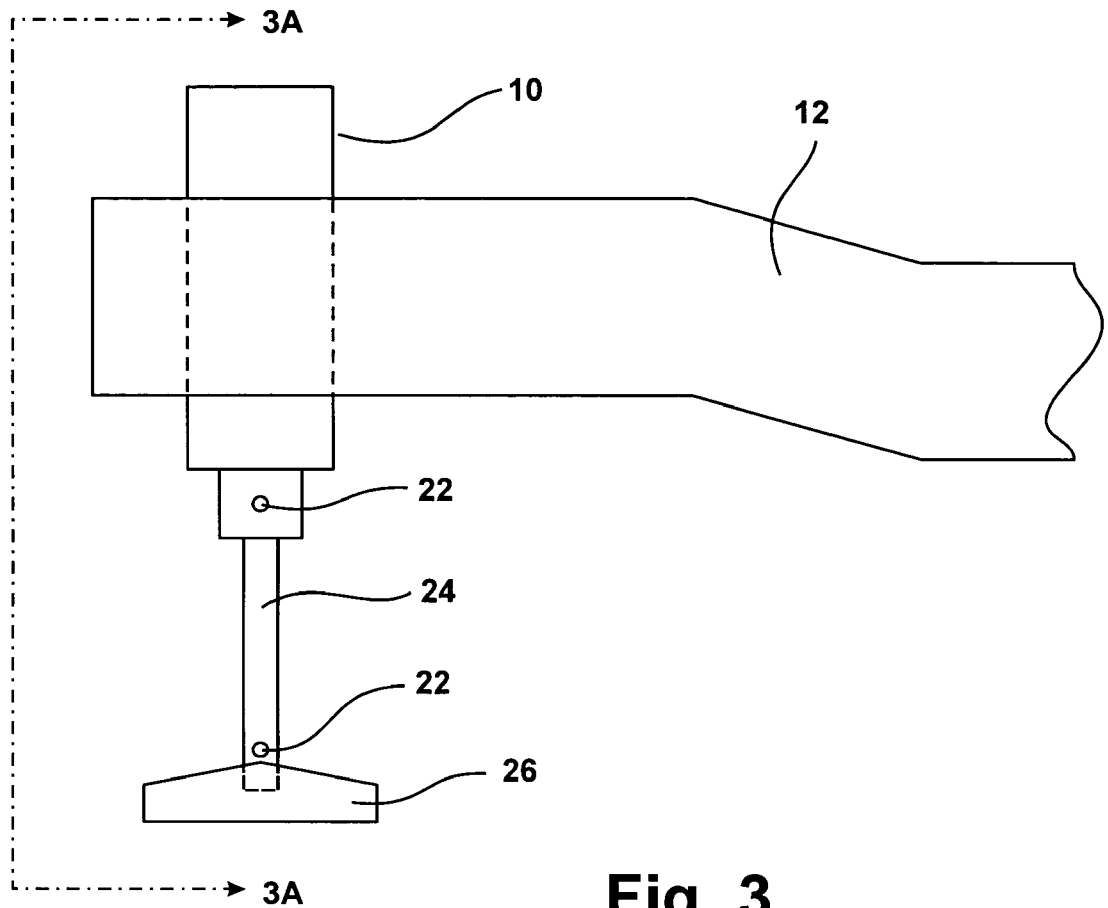
FIG. 3 is a side view of an automobile frame showing one lift mechanism of the present invention in its extended position.
Figure 3A:
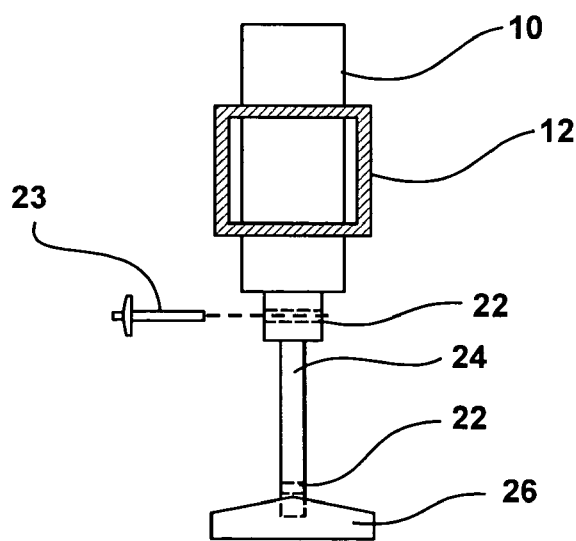
FIG. 3A is a front section view of an automobile frame showing one lift mechanism of the present invention in its extended position.

According to FIGS. 3 and 3A, cylinder 10 is mounted through frame 12 by means of welding or mechanical fasteners. Piston rod 24 is shown in its extended position. Holes 22 are provided for purposes of inserting pin 23 in either the extended or retracted position to provide additional safety.

Figure 4:
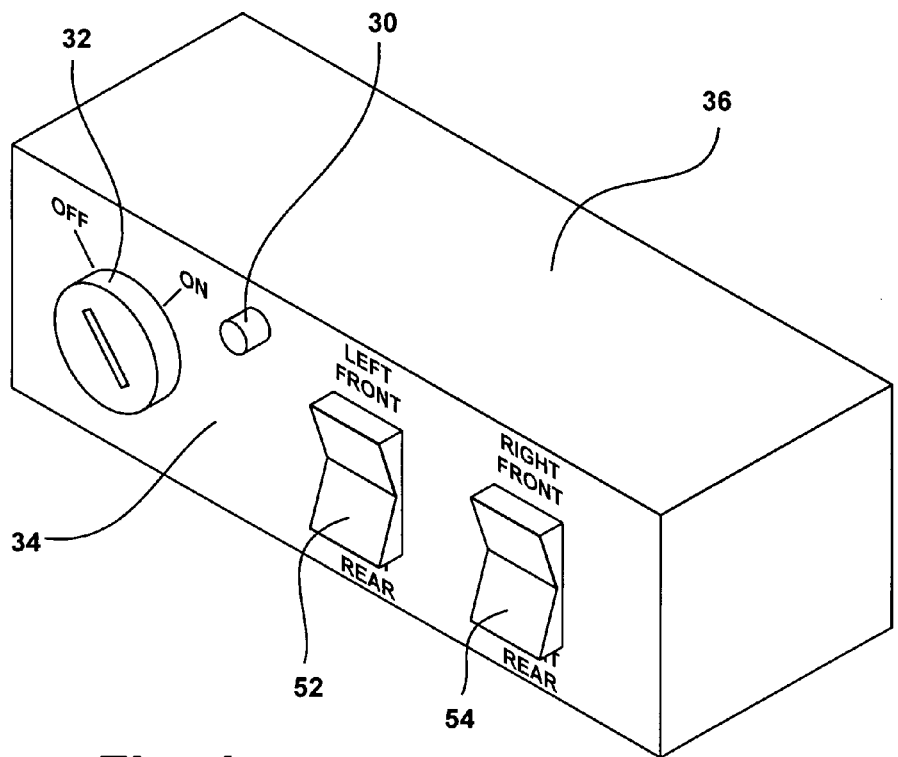
FIG. 4 is a perspective view of the control box assembly.

According to FIG. 4, control panel 34 is mounted to the front of control box 36. Control panel 34 provides mounting of controls and indicators as follows: key switch 32, light emitting diode (LED) 30, and single pole, double throw (SPDT) switches 52, 54.

Figure 4A:
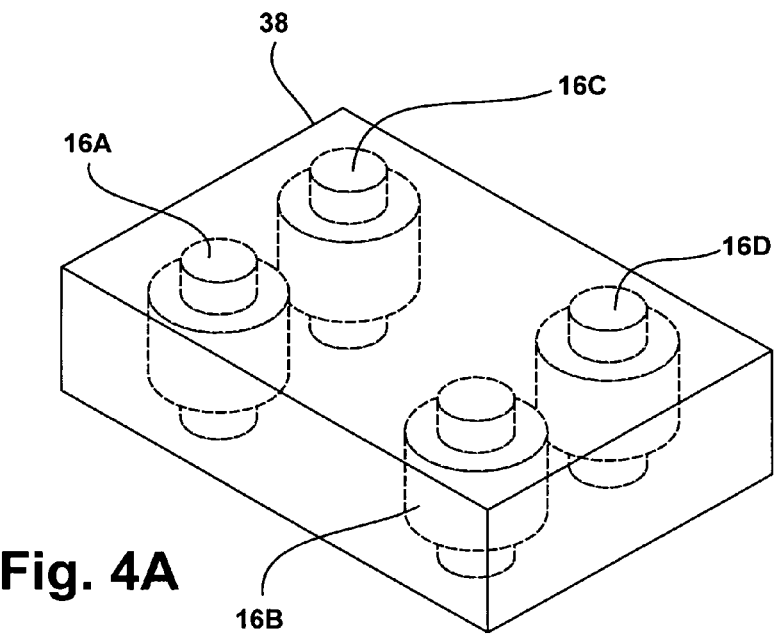
FIG. 4A is a perspective view of the pneumatic manifold assembly showing the four pneumatic solenoids in phantom view.

According to FIG. 4A, 4-way distribution manifold 38 contains four solenoids 16A, 16B, 16C, and 16D. 4-way distribution manifold 38 provides means to evenly distribute air from compressor 14 to solenoids 16A, 16B, 16C, and 16D.

Figure 5:
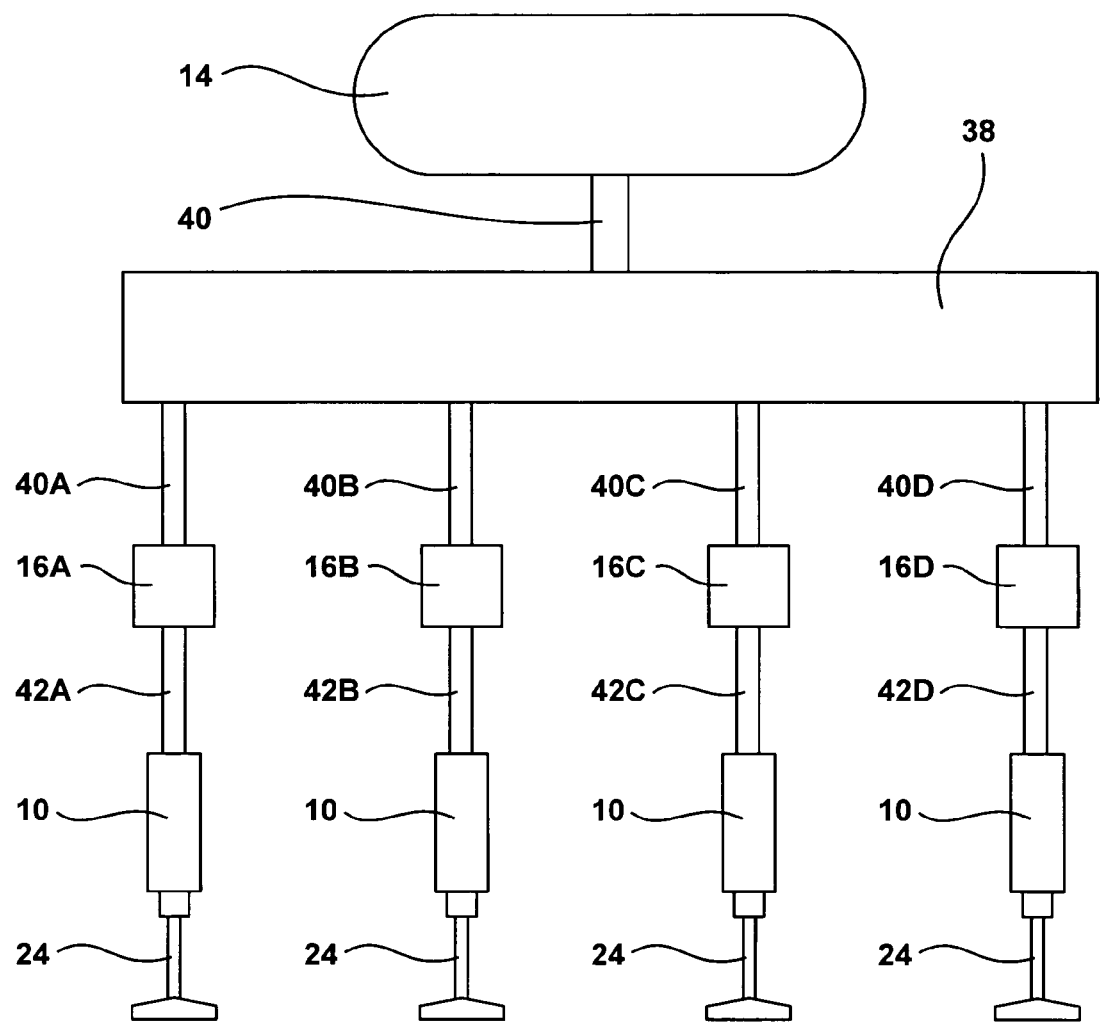
FIG. 5 is a pneumatic schematic of the present invention.

FIG. 5 is a schematic representation of the pneumatics contained in the present invention. Compressor 14 provides air to 4-way distribution manifold 38 via air line 40. Air is routed to solenoids 16A, 16B, 16C, and 16D via air lines 40A, 40B, 40C, and 40D, respectively. Upon activation solenoids 16A, 16B, 16C, and 16D provide air pressure to cylinders 10 via air lines 42A, 42B, 42C, and 42D, respectively.

Figure 6:
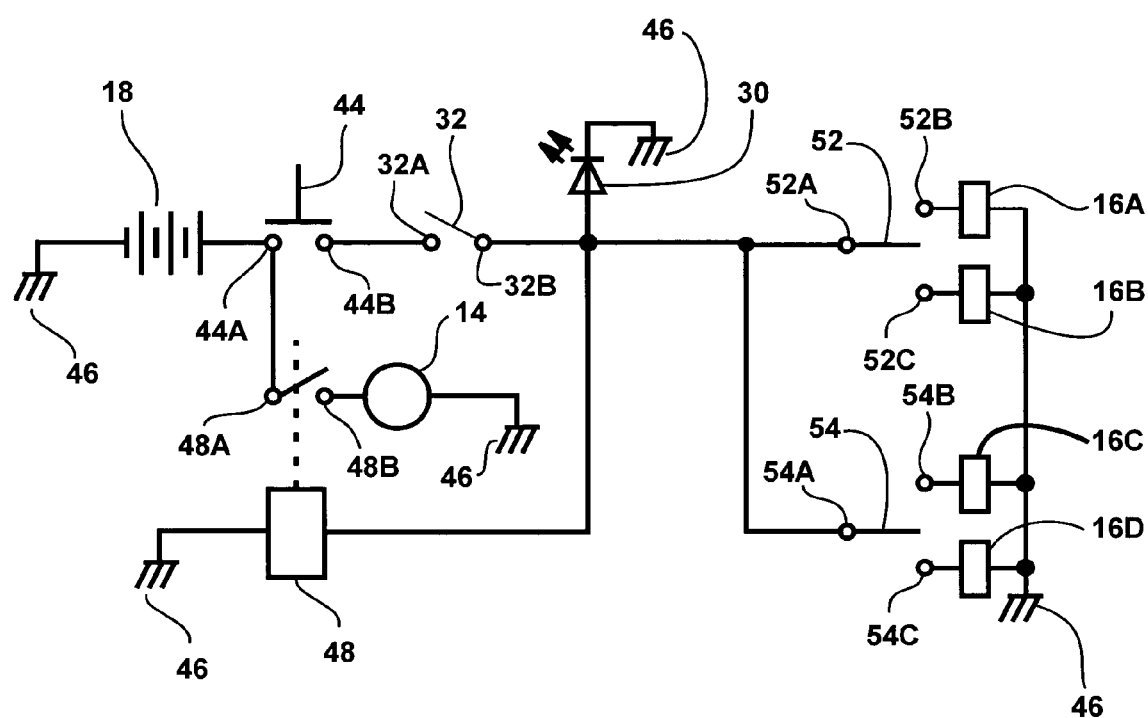
FIG. 6 is an electrical schematic of the present invention.

FIG. 6 is an electrical schematic of the present invention. Electrical power from battery 18 is routed to contact 48A of solenoid 48, as well as contact 44A of interlock switch 44, which is connected to the parking brake of vehicle 8. When the parking brake is applied, interlock switch 44 closes, routing electrical power to key switch 32 contact 32A via interlock switch 44 contacts 44A, 44B. Prior to use, the operator removes pin 23 (FIG. 3A) from hole 22.

When key switch 32 (FIG. 6) is turned to the ON position, electrical power is routed via contacts 32A and 32B to solenoid 48, LED 30, and contacts 52A and 52B of SPDT switches 52 and 54, respectively. When solenoid 48 receives electrical power, contacts 48A and 48B close, delivering high-current electrical power to compressor 14, activating it. Compressor 14 is a commercially available unit that provides suitable air pressure to lift one or more of vehicle 8's wheels 20 off of the ground 80. A built-in pressure switch allows compressor 14 to shut off when the desired air pressure is attained.

When LED 30 receives electrical power, it illuminates, indicating to the operator that the system is powered up and ready for use.

SPDT switches 52, 54 (FIGS. 4 and 6) are three-position rocker switches, with the center position used as the OFF position. When SPDT switch 52 is moved to the LEFT FRONT position, electrical power is routed from contact 52A (FIG. 6) to contact 52B, delivering electrical power to solenoid 16A. Solenoid 16A allows air pressure to be routed to cyl. 10 by line 42A, lifting the left front tire of vehicle 8 off of the ground 80. Typically, the operator will then insert pin 23 (FIG. 3A) into hole 22, preventing piston rod 24 from retracting.

After desired repairs are carried out, the operator removes pin 23 (FIG. 3A) from hole 22, allowing piston rod 24 to retract. Moving SPTD switch 52 (FIGS. 4 and 6) to the center (OFF) position removes electrical power from solenoid 16A (FIG. 6), permitting it to bleed air pressure from cylinder 10, lowering tire 20 to the ground 80. The operator then inserts pin 23 (FIG. 3A) into hole 22, preventing piston rod 24 from lowering.

In a like manner, SPDT switch 52 (FIGS. 4 and 6) activates solenoid 16B to raise the left rear of vehicle 8. Depending upon its position SPDT switch 54 activates solenoids 16C and 16D, raising the right front or right rear of vehicle 8.

Electrical chassis grounds 46 are provided for all electrical elements of the present invention.

What is claimed is:

1. An automobile pneumatic jack assembly comprising:
   Two to four pneumatic cylinders capable of lifting a vechicle to a suitable height to allow repairs to tires and at least some vehicle parts,
   at least one compressor,
   at least one distribution manifold assembly, and
   electrical controls having a power relay activated by low current voltage which applies high current voltage to the compressor; and wherein said power relay reduces the need town high current carrying wiring to a control box and allows the use of low current components for controlling the operation of said pneumatic jack assembly.

2. The automobile pneumatic jack assembly according to claim 1 wherein said pneumatic cylinder assemblies are mounted to said automobile chassis through said frame by a connection selected from welding, mechanical fasteners, or brazing.

3. The automobile pneumatic jack assembly according to claim 1 wherein said pneumatic cylinder assemblies are mounted to said automoblike chassis through said frame by a connection selected from welding, brazing and mechanical fasteners.

4. The automobile pneumatic jack assembly according to claim 1 wherein said air compressor is mounted in a location within the vehicle permitting efficient routing of pneumatic and electrical supplies.

5. The automobile pneumatic jack assembly according to claim 1 wherein said distribution manifold assembly accepts air pressure from said air compressor and delivers it to said pneumatic cylinders via pneumatic solenoids.

6. The automobile pneumatic jack assembly according to claim 5 wherein said air distribution manifold assembly contains a plurality of said pneumatic solenoids, one for each of the pneumatic cylinders.

7. The automobile pneumatic jack assembly according to claim 6 wherein each of the pneumatic solenoids operate on electrical power and conduit means direct air pressure to said solenoid's corresponding pneumatic cylinder.

8. The automobile pneumatic jack assembly according to claim 1 wherein said electrical controls comprise a power relay, a control box, and an electrical interlock swithch.

9. An electrical control system for an automobile pneumatic jack assembly comprising:
   a power relay activated by low current voltage which applies high current voltage to a compressor; and wherein said power relay reduces the need to run high current carrying wiring to a control box and allows the use of low current components;
   a control box; and
   an electrical interlock switch,
   wherein said electrical interlock switch is activated when the vehicle's parking brake is applied, ensuring the vehicle is secured prior to system operation.

10. The electrical control system for an automobile pneumatic jack assembly according to claim 9 wherein said control box contains switching and indicating circuitry for the operator.

11. The electrical control system for an automobile pneumatic jack assembly according to claim 10 wherein said control box contains a key switch that provides extra safety measures to ensure the system is not accidently activated.

12. The electrical control system for an automobile pneumatic jack assembly according to claim 11 wherein said control box contains a plurality of three-position rocker switches to direct electrical power to said pneumatic solenoids when activated by the operator.

13. The electrical control system for an automobile pneumatic jack assembly according to claim 12 wherein said control box contains a light emitting diode (LED) that illuminates when power is applied to the system.

14. An electrical control system for an automobile pneumatic jack assembly comprising: a power relay; a control box; and an electrical interlock switch, wherein said electrical interlock switch is activated when the vehicle's parking brake is applied, ensuring the vehicle is secured prior to system operation; and wherein said power relay is activated by low-current voltabe when commanded by the operator and applied high-current voltage to said air compressor.

15. The automobile pneumatic jack assembly according to claim 14 wherein said air compressor uses vehicle electrical power and is capable of providing adequate air pressure to lift a vehicle to a suitable height to allow repairs to tires and at least some other automobile parts.

16. The control system for an automobile pneumatic jack assembly according to claim 14 wherein said control box contains switching and indicating circuitry for the operator.

17. A control system for an automobile pneumatic jack assembly according to claim 14 comprising: switching and indicating circuitry for the operator; at least one key switch that provides safety to ensure the system is not accidently activated; said control box also containing a plurality of switches to direct electrical power respectively to said pneumatic solenoids when activated.

* * * * *